United States Patent Office 3,121,463  
Patented Feb. 18, 1964

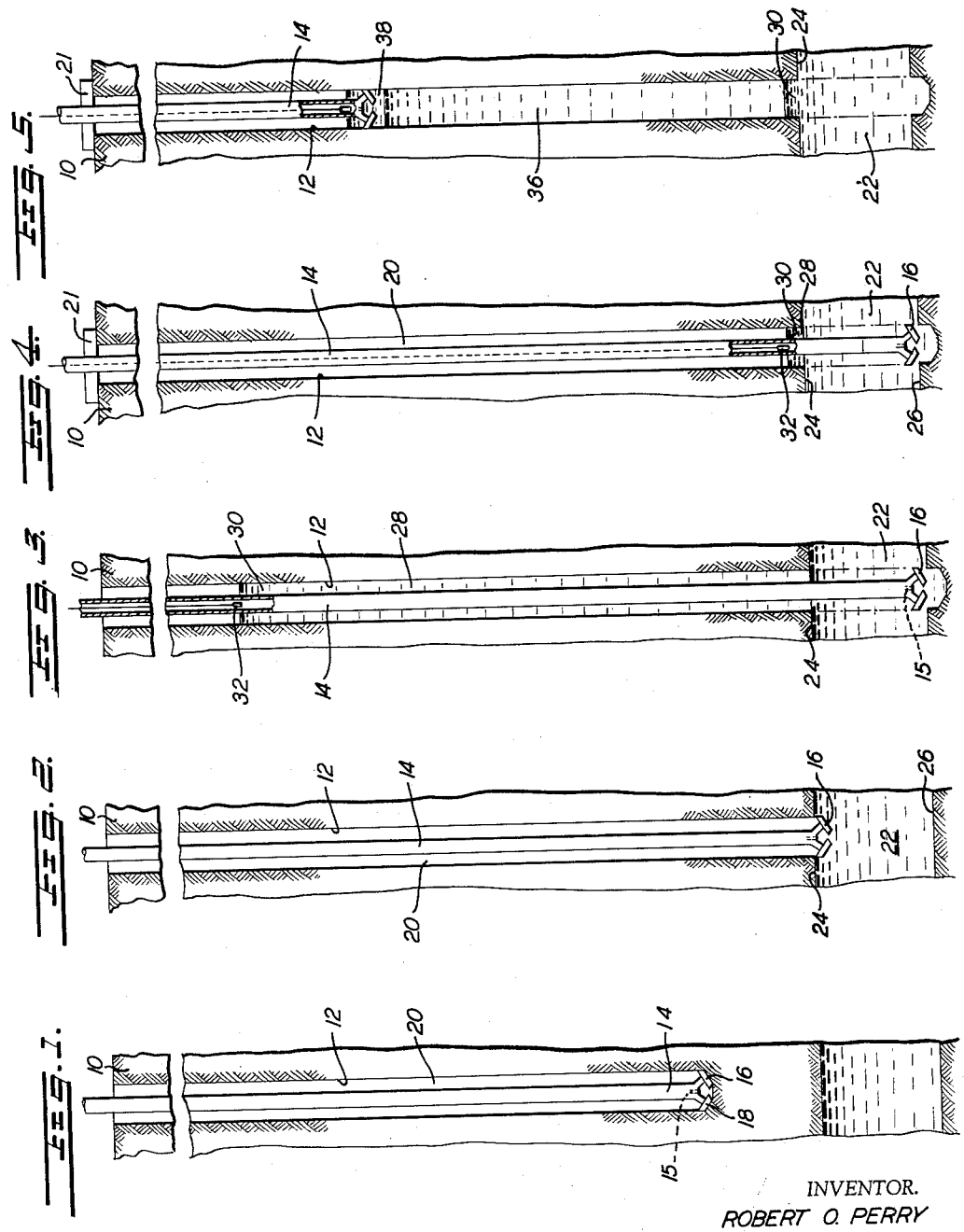
INVENTOR.
ROBERT O. PERRY
BY Adams, Forward, & McLean
ATTORNEYS

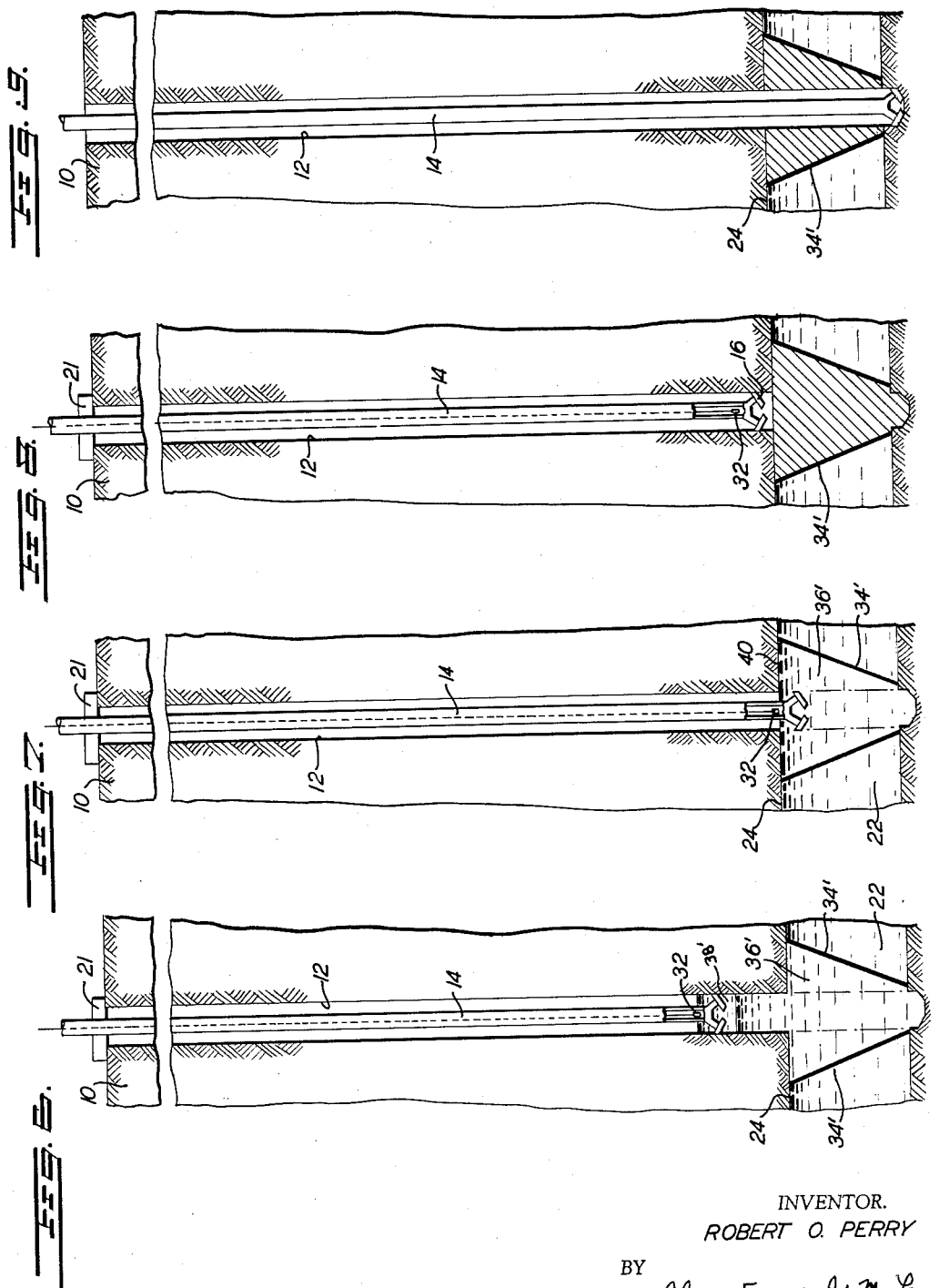

3,121,463  
METHOD FOR DECREASING WELL PERMEABILITY USING ELECTRICAL CONDUCTIVE COMPOSITIONS  
Robert O. Perry, Tulsa, Okla., assignor to Sinclair Research, Inc., Wilmington, Del., a corporation of Delaware  
Filed Jan. 22, 1962, Ser. No. 168,581  
11 Claims. (Cl. 166—33)

This invention relates to novel electrically conductive liquid resin-forming compositions and more particularly the present invention is concerned with electrically conductive compositions including an alkylidene bisacrylamide, an ethylenic monomer, and calcium chloride.

These liquid resin-forming materials have particular utility in the well treating field, e.g. processes which partially or completely plug permeable subterranean well areas and other processes which combat the obstruction of gas circulation when gas drilling wells through permeable subsurface formations. In processes of this character knowledge of the position of the resin-forming material in the well bore is highly desirable if proper and effective placement of this material down the hole is to be accomplished.

Electrical conductivity measuring devices can be advantageously employed as means for detecting the position of the resin-forming material in the well bore. When devices of this sort are used the material is usually placed between two liquids of different electrical conductivity, e.g. a weak brine (about 1000 to 15,000 parts per million, p.p.m., of NaCl) and a strong brine (about 30,000 p.p.m. of NaCl to saturation), since the material itself usually has low conductivity. Thus by maneuvering the device, the interfaces between the two liquids of different electrical conductivity and the resin-forming composition can be located, and by checking the depth of the device the position of the material is known. During placement down the hole, however, the resin-forming material acquires an amount of salt which makes the electrical conductivity of the composition the same as weak brine and, therefore, undetectable from the weak brine.

The present invention is directed to liquid resin-forming compositions suitable for use in the well treating field and exhibiting advantageous electrical conductivity characteristics to enable detection in well bores. This is accomplished by including calcium chloride in the compositions. Calcium chloride is highly desirable in this respect since, unlike sodium chloride for example, it will not unduly prolong the induction period, i.e. the time required for the catalyst to produce enough free radicals to initiate polymerization, particularly after the resin-forming material has been placed in position down the hole.

The liquid resin-forming compositions of the present invention are particularly suitable for use in the well bore treating field and include an aqueous solution of an alkylidene bisacrylamide, an ethylenic comonomer, and calcium chloride, the bisacrylamide having the formula:

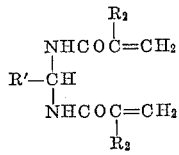

in which

is a hydrocarbon residue of an aldehyde containing, for instance, from about 1 to 10 and preferably from about 1 to 5 carbon atoms, e.g. formalde-, acetalde-, and valeraldehyde; but usually about 1 to 3 carbon atoms; and $R_2$ is a member of the group consisting of hydrogen and a methyl radical.

The other comonomer is a solid, liquid or gaseous ethylenic (i.e., contains at least the $>C=C<$ radical) compound with a solubility of at least about 2 percent by weight, and preferably at least about 5 percent, in water and which copolymerizes with the aforesaid bisacrylamide in an aqueous system. Although not essential in practicing the invention, it is preferred to select an ethylenic comonomer which is preferably soluble or at least self-dispersible in water wtih appropriate stirring, as such, for example, methylene-bisacrylamide, which is capable of polymerizing.

In addition to the comonomer N,N'-methylenebisacrylamide set out in the examples hereinafter, any of the alkylidene bisacrylamides corresponding to the above formula which are described and claimed in Lundberg Patent No. 2,475,846 hereby incorporated by reference, or mixtures thereof may be used as cross-linking agents. Only slight solubility is required of the alkylidene bisacrylamide in view of the small amount used; therefore, this component may have a water solubility as low as about 0.02 percent by weight at 20° C. but a solubility of at least about 0.10 percent is more desirable for general purposes.

A wide variety of ethylenic comonomers or mixtures thereof are copolymerizable with the alkylidene bisacrylamides; those having a formula containing at least one $>C=C<$ group, preferably containing from about 1 to 8 carbon atoms, hereinafter referred to as the ethenoid group, and having appreciable solubility in water are suitable for use in the present invention. See U.S. Patent No. 2,801,985, hereby incorporated by reference. As set forth in this patent, the unsubstituted bonds in the ethenoid group may be attached to one or more of many different atoms or radicals including hydrogen, halogens, such as chlorine and bromine, cyano, aryl, aralkyl, alkyl, and alkylene with or without solubilizing groups attached to these hydrocarbons. In addition, the substituents on the ethenoid group may comprise one or more hydrophilic groups including formyl, methylol, polyoxyalkylene residues and quaternary ammonium salt radicals,

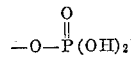

—OOCH; —OOCCH$_3$; —SO$_3$X, where X is H, NH$_4$, an alkali metal or an alkylamine; —CONR$_2$ and

—CH$_2$CONR$_2$ where each R is hydrogen, alkylol, lower alkyl or a polyoxyalkylene radical; and —COOR' and —CH$_2$COOR', where R' is a H, NH$_4$, alkali metal, alkaline earth metal, organic nitrogenous base, alkylol, lower alkyl or polyoxyalkylene radical. The large number of combinations and proportions of the various suitable substituents makes it impractical to list all compounds in this category which may be employed. The water solubility of these substances is known to depend chiefly on the number and type of hydrophilic and hydrophobic radicals therein; for example, the solubility of compounds containing an alkyl radical diminishes as the length of the alkyl chain increases and aryl groups tend to decrease water solubility whereas the aforesaid hydrophilic substituents all tend to improve the solubility of a given compound in water. Accordingly, the comonomer should be selected according to chemical practice from those containing sufficient hydrophilic radicals to balance any hydrophobic groups present in order to obtain the requisite water solubility of monomer.

Among the water-soluble ethenoid monomers, those containing an acrylyl or methacrylyl group are especially recommended. These are exemplified by N-methylol acrylamide, calcium acrylate, methacrylamide and acrylamide. Other suitable ethenoid compounds are acrylic acid; other N-substituted acrylamides, such as N-methylacrylamide, N-3-hydroxy-propylacrylamide, dimethylamino-propylacrylamide, N-ethylol acrylamide; acrylonitrile; saturated alkyl esters of acrylic acid, i.e. methyl acrylate, β-hydroxyethyl acrylate; ethylene glycol and polyethylene glycol acrylates, an example being the reaction product of β-hydroxyethylacrylate or acrylic acid with about 1 to about 50 mols or more of ethylene oxide; salts of acrylic acid, i.e. magnesium acrylate, sodium acrylate, ammonium acrylate, zinc acrylate, β-aminoethylacrylate, β-methylaminoethylacrylate, guanidine acrylate and other organic nitrogenous base salts, such as diethylamine acrylate and ethanolamine acrylate; quaternary salts like alkyl acrylamidopropyl dimethylamino chloride; acrolein, β-carboxyacrolein, butenoic acid; α-chloroacrylic acid; β-chloroacrylic acid; as well as methacrylic acid and its corresponding derivatives.

Maleic acid and its corresponding derivatives including partial esters, partial salts, and ester salts thereof; maleamic, chloromaleic, fumaric, itaconic, citraconic, vinyl sulfonic, and vinyl phosphonic acids and their corresponding derivatives and mixtures thereof can also be used. Derivatives of this kind and other suitable compounds include α,β-dichloroacrylonitrile, methacrolein, potassium methacrylate, magnesium methacrylate, hydroxyethyl methacrylate, zinc β-chloroacrylate, trimethylamine methacrylate, calcium α-chloromethacrylate, diethyl methylene succinate, methylene succindiamide, monomethyl maleate, maleic diamide, methylene maloanamide, diethyl methylene malonate, methyl isopropenyl ketone, ethyl vinyl ketone, propyl vinyl ketone, vinyl formate, vinyl lactate, vinyl acetate, vinyl bromoacetate, vinyl chloroacetate, vinyl pyrrolidone, allyl levulinate, allyl alcohol, methallyl alcohol, diallyl carbonate, allyl lactate, allyl gluconate, di(β-aminoethyl) maleate, di-(methylaminoethyl) maleate, di(N,N'-dimethyl-β-aminoethyl) maleate, sulfonated styrene, vinyl pyridine, maleic anhydride, sodium maleate, ammonium maleate, calcium maleate, monopotassium maleate, monoammonium maleate, monomagnesium maleate, methyl vinyl ether, N-aminoethyl maleamide, N-aminoethyl maleimide, alkyl aminoalkyl maleamides, N-vinyl amines, N-allyl amines, heterocyclic ethenoid compounds containing nitrogen in a tertiary amino group, and the amine and ammonium are salts of said cyclic compounds, N-vinyl acetamide, N-vinyl-N-methyl formamide, N-vinyl-N-methylacetamide, N-vinyl succinimide, N-vinyl diformamide, N-vinyl diacetamide, vinyl sulfonyl chloride, vinyl sulfonic acid salts, vinyl sulfonic acid amides, vinyl oxazolidone, allyl amine, diallyl amine, vinyl methyl pyridinium chloride, and allyl trimethyl ammonium chloride to name only a few of the operative compounds.

The preferred resin-forming composition of the present invention is in an aqueous medium and has an initial viscosity approximating that of water. These compositions can be formed by dissolving a mixture of acrylamide and N,N'-methylenebisacrylamide in fresh water. Generally, this mixture contains about 1 to 25 weight percent of N,N'-methylenebisacrylamide and about 99 to 75 weight percent of acrylamide. The aqueous solution will usually include from about 5 weight percent of this mixture to its limit of solubility and preferably this amount is about 5 to 25 percent while the $CaCl_2$ will generally comprise from about 0.5 to 3 or 5 weight percent and preferably from about 0.8 or 1 to 2 weight percent on the basis of the aqueous solution of resin forming material. Although the acrylamide as such is preferred, its nitrogen atom could be substituted as with a hydroxy methyl or a hydroxy ethyl group.

In addition to the above-mentioned ingredients, the compositions may include other components, particularly when they are destined for use down well holes, e.g. in processes for plugging permeable well areas. For instance, compounds exhibiting catalytic activity or weighting agents may be added. Components exhibiting catalytic activity can be added prior to injection of the compositions in the well bore. Care must be exercised as to the amount of catalytic material added and this will depend upon the specific component employed, however, this amount should be such that sufficient working time is provided to permit displacement of the composition into the permeable area to be plugged before it hardens into the solid or semi-solid state. In general, the working life of the material at the temperatures and pressures encountered in the bore hole is such that it has a viscosity of up to about 10 to 15 centipoises, advantageously about 1 to 5 centipoises, at these conditions for at least 15 minutes, and preferably for at least about 30 minutes. When referring to "working life" we mean the time which elapses after all essential ingredients for the formation of the solid or semi-solid plugging resin or plastic under the conditions of temperature and pressure found in the area of the well bore to be plugged have been added, for instance monomer, catalyst, promoter, etc. Ammonium persulfate is an acceptable catalyst to polymerize the aqueous mixture and it can be employed with a promoter such as sodium thiosulfate or nitrilo-tris-propionamide. The amounts of each of the catalyst and promoter usually are about 0.1 to 2 weight percent based on the aqueous solution of resin-forming material, and these amounts can be varied to give the desired working life. For instance, a weight ratio of catalyst to promoter of 1 to 2 in an aqueous solution containing 20 weight percent of the acrylamide and N,N'-methylenebisacrylamide (95 percent acrylamide and 5 percent N,N'-methylenebisacrylamide) will give a working life at 70° F. of about 60 to 120 minutes when the catalyst plus promoter is about 0.5 to 1.5 percent of the aqueous solution.

As to using the electrically conductive composition in some well plugging processes, unless the material is light enough to remain upon the surface of the salt water which has a specific gravity greater than 1, generally at least about 1.2, it must be quickly displaced into the permeable area before it can disperse into the salt water phase or an overlying fresh water layer, if any be present. To reduce the chances of this happening, resin-forming materials having specific gravities of up to about 1.18, preferably up to about 1.13, can be used. Also, as it may be advantageous to locate the resin-forming material between the salt water layer and an overlying fresh water column, the resin-forming material can preferably have a specific gravity of at least about 1.07, more desirably at least about 1.11. The specific gravity of the resin-forming material can be adjusted by the addition of weighting agents. Suitable weighting agents include water-soluble, non-ionizing organic compounds, e.g. sugar and glycerol. The electrically conductive compositions are usually of a conductivity intermediate (about 300 ma. at 6 volts) to the high conductivity (about 460 ma. at 6 volts) of the salt water layer and the low conductivity (about 120 ma. at 6 volts) of the overlying fresh water column. Accordingly, with the use of electrical conductivity detection means, the composition can be tracked and positioned at desirable locations in the well bore when employed in well plugging processes.

As set forth above, the compositions of the present invention can be used in a method employed in plugging a permeable well location, for instance, in a method described in copending application Serial No. 642,867, filed February 27, 1957, hereby incorporated by reference. In this method the area to be plugged must first be located as to its vertical position in the well bore.

This area is spaced away from the bottom of the bore and generally will be between two adjacent areas of lesser permeability although this is not an absolute necessity. Salt (NaCl) water or brine is then provided in the well bore in an amount sufficient to reach the approximate location of the area to be plugged. The level of the salt water can be at or slightly below or above the plugging area but it should not be vertically displaced a distance from the area such that substantial plugging occurs in locations where it is not desired. The salt water can be added as such to the well, or fresh water can be injected which after remaining a sufficient period in the bore will become salty due to the presence of salt in the earth's strata. After the proper level of salt water is established an organic resin-forming material is positioned on this medium. Preferably, the salt water layer is below a fresh water layer with these materials forming an interface in the approximate location of the permeable area, and in this case the resin-forming material is positioned on the salt water layer and thus in the interface between these layers. The resin-forming material is then displaced into the adjacent well area or stratum as by natural flow or by a separately applied gaseous or liquid pressure and allowed to remain in the area to set up or harden to provide a partial or complete plug resistant to the flow of fluids, particularly liquids. The permeable area to be plugged can be located by conventional procedures, e.g. the use of liquid-to-liquid interfaces between two dissimilar liquid such as water and oil, fresh and salt water, and radioactive and non-radioactive liquids, e.g. see U.S. Patents Nos. 2,376,878 and 2,413,435 and Pfister, R. J. Trans, A.I.M.E., vol. 174, page 269, 1948, to determine the injectivity profile or liquid injection characteristics of the well or sand face. Thus, after the resin-forming material is displaced into the adjacent well area, radio-activity or gamma ray source can be lowered into the well bore, the resin-forming composition, in this instance, an aqueous solution of alkylidene bisacrylamide and an ethylenic monomer, is irradiated and polymerization is effected. The radioactivity source is removed, the polymerized material is a rigid solid and thus seals the permeable formation.

Usually the resin-forming material is charged to the bore at a rate faster than it will pass into the adjacent formation. Thus, a layer of the material will be formed. It is frequently advantageous to know that the resin-forming material is at least approximately opposite the permeable area which is to be plugged before this material is displaced into the adjacent well area. The procedure for locating the position of the resin-forming material in the well bore can be varied. For instance, the characteristics of the material can be such that it is detectable by an electrical conductivity profiling unit when the material is placed on the salt water layer or between the salt water-fresh water columns. Thus, if the resin-forming material be essentially of intermediate electrical conductivity, the conductivity profiling instrument will indicate distinct degrees of current flow when it enters the salt or fresh water layers on either side of the resin-forming material.

For instance, in a typical field operation the brine layer will have a high conductance of about 460 milliamps (ma.) at 6 volts while the fresh water or weak brine will indicate a low conductance of about 120 milliamps at this voltage. Thus, in order for the conductivity circuit to distinguish between the fresh water, brine and resin-forming material, the latter should be essentially non-conductive or intermediate between about 120 and 460 ma., preferably about 300 ma., at the applied voltage. When the conductivity circuit is essentially null, or about 300 ma., then the instrument is in the layer of resin-forming material and by checking the depth of the detecting instrument the location of this layer is determined. Should the layer not be opposite the area desired to be plugged, fresh water can be added around the well tubing to depress the level of the layer or salt water can be added through the tubing to the lower brine layer in the well to raise its level as desired. Thus, the layer of resin-forming material can be located opposite the area to be plugged either by merely placing the material in this area or by following the placing with regulation of the position of the layer through salt or fresh water addition if such regulation be necessary. Also, it may be desirable to keep determining the location of the resin-forming material as it is being moved into the formation in order to be sure that it is at the proper level; if it is not at the desired location, adjustments in the fresh or salt water flows may be in order. As the location of the resin-forming material becomes more unpredictable during its discharge from the well bore, the greater its viscosity differs from that of water since usually the permeability or injection characteristics of the bore have been determined while using aqueous media.

The compositions of the present invention can also be used in a method for combatting the effect of a reduction or a cessation of the air circulation in air-drilling methods when drilling through permeable areas from which gas, liquid or loosely consolidated strata enters the well bore being drilled. The desired result is accomplished by selectively and substantially completely sealing formations of this character from the well bore in an expeditious and economical manner so as to maintain the advantages of the air-drilling procedures over the conventional procedures which use mud as the circulating medium.

According to this method, when an obstruction of air circulation, i.e. a reduction or cessation thereof, is experienced during an air-drilling operation and the obstruction is attributed to the ingress of gas, liquid or loosely consolidated earth particles into the bore from an adjacent stratum, resin-forming material is introduced into the well bore. This material is of the type that will harden at temperatures encountered in the well bore, which in many cases are between about 50 to 80° F. The quantity of resin-forming material used must be adequate to extend horizontally into the formation of ingress for a distance sufficient to securely seal this formation subsequent to the hardening of the resinous material to prevent further ingress of unwanted extraneous materials. This distance usually extends at least about six inches into the formation. Moreover, in this method it is imperative that the resin-forming composition occupy the well bore adjacent the formation of ingress when the hardened resin is formed. Accordingly, after the introduction of the resin-forming composition into the well bore detection means are employed to track the upper level of the resin-forming composition, gas or liquid, e.g. air or water pressure is applied to bring this upper level approximately adjacent the upper level of the strata of ingress, and the resinous composition is maintained in this position until it solidifies. Although air, other gas or liquid pressure can be employed in our method, air is preferable since (a) it permits better control of the plastic material, (b) the position of the resin-forming material is determined with facility as a result of the sharp difference in electrode readings (milliamps) between plastic and air and (c) the well bore is dry following the polymerization of the resin-forming composition. The gas pressure will depend upon the nature of the obstruction encountered and the depth of the permeable formation; it is generally greater than about 150 p.s.i. but is usually about 150 to 1000 p.s.i. Since tremendous pressures can be required, it may be desirable to produce such pressures by employing liquid and gas in combination, e.g. provide a liquid column above the resin-forming composition and exert air pressure on the liquid column. Following solidification of the resinous composition, air-drilling is resumed.

As an alternative to this method, a small volume of liquid or primary buffer can be placed before the resin-forming material to prevent contact of the resinous material with the materials in the lower portion of the well bore, e.g. salt water. This primary buffer should have a density in between that of the well bore fluid and the resinous material so that the buffer will have a tendency to float or remain between the well fluid and resinous material. It should also possess a degree of electrical conductivity appreciably different from that of the resin-forming material to facilitate tracking of the resin-forming material when in the well bore.

In another modification of this method it may also be desirable to place on the resin-forming material a volume of liquid or secondary buffer possessing a degree of electrical conductivity appreciably different from that of the resin-forming material to facilitate tracking of the resin-forming material; the density of the secondary buffer should be less than that of the resinous material and preferably greater than that of any fluid, liquid, or gas, used to pressure the resinous material to its position of hardening. Since the resin-forming compositions of the present invention can be made electrically conductive, the secondary buffer can be essentially non-conductive.

The detection means employed for tracking the position of the resin-forming material in the well bore can vary. In one method using a secondary buffer, the characteristics of the material can be such that it is detectable by an electrical conductivity profiling unit when the secondary buffer is placed on the resin-forming material. Thus, if the secondary buffer is essentially non-conductive and the resin-forming composition is essentially conductive the conductivity profiling unit will indicate the degrees of current flow within the resin-forming composition and secondary buffer. Accordingly, when the conductivity circuit is essentially poor, the instrument is in the secondary buffer and when the conductivity circuit is essentially good, the instrument is in the resin-forming composition. Thus by raising and lowering the instrument the interface in-between the resin-forming material and the secondary buffer can be located and by checking the depth of the detection instrument the location of the upper layer of the resin-forming material is known.

A device suitable for use in measuring the electrical conductivity of the fluids in the well bore is described in U.S. Patent No. 2,776,563. This device, known as a magnetic coupler, includes a magnetic core, and two electrically conducting coils essentially composed in two basic combinations. One of the combinations, conveniently referred to as a magnetic coupler sub, is essentially comprised of one of the coils, the first coil, surrounding the magnetic core, and fixedly mounted within a structure. The other combination, conveniently referred to as the stinger, comprises a cable containing an insulated electrical conductor communicating with the other coil which is contained within a structure adapted to removably surround the first coil. Under operational conditions the magnetic coupler sub may be installed in a position just above the drill bit in a rotary type drill string. Accordingly, when the position of a liquid of known electrical conductivity within the well bore is desired, the stinger is lowered into the drill pipe string and joined to the magnetic coupler sub, the drill pipe is maneuvered until the liquid or the interface between liquids is located, and by noting the depth of the stinger, the position of the liquid or the interface between two liquids is known. Additionally, if a two-conductor cable is employed in the stinger arrangement the stinger itself can be used as an integral detection unit.

The following specific examples will serve to illustrate my invention but is not to be considered limiting.

EXAMPLE I

Composition Preparation

To 890 parts of water under ambient conditions are added 95 parts of acrylamide, 5 parts of N,N′-methylenebisacrylamide, and 10 parts calcium chloride. This resin-forming composition is suitable, for example, for placement into a permeable subterranean well bore area. It has an electrical conductivity of 73.5 ohms per cubic centimeter. This would be about 300 ma. at 6 to 8 volts when employed in a well operation.

This composition when mixed with 0.4 percent ammonium persulfate and 0.8 percent nitrilotrispropionamide is not particularly catalyzed by contact with iron, brass or copper and has an initial viscosity (1.3 centipoises) approximating that of water (which is about 0.5 to 1.5 centipoises under the conditions in many well bores) and is not greater than about 2.0 centipoises over its working life to facilitate its placement in the desired well area. The specific gravity of the mixture is about 1.12.

EXAMPLE II

The following example illustrates a method using the compositions of the present invention for combatting the obstruction of gas circulation when gas-drilling wells through permeable subsurface formations.

The example can best be described with reference to the drawing, FIGURES 1 through 9, in which several distinct phases of the method are illustrated.

Referring to the drawing, FIGURE 1, the numeral 10 represents the earth's surface through which a well bore 12 is being drilled to an oil-producing formation with rotary drilling pipe 14 containing a rotary bit 16 at the lower end. Pressurized air is introduced into drill pipe 14 at the surface of the earth, is conducted downwardly therein, exits through opening 15 of rotary drill bit 16 at the site of formation of drilling 18, and passes upwardly through annulus 20, surrounding drill pipe 14, carrying relatively small as well as larger rock particles from the site of drilling to the earth's surface.

In FIGURE 2, rotary drill bit 16 penetrates a salt water formation 22 at its upper level 24 as indicated by a reduction in air circulation as well as the muddy nature of the particles recovered from the site of drilling. The depth of the drill bit is noted and thus the position of upper level 24 of salt water formation 22 is known. In FIGURE 3 drilling is continued through the salt water-bearing formation, air circulation eventually ceases due to the back pressure of the salt water, a column of salt water 28 rises in the well bore to level 30, a detecting device 32 consisting essentially of a stinger employing a two-conductor cable is inserted to locate the upper level 30 of the column of salt water which has an electrical conductivity of about 460 ma. at 6 volts. The lower level 26 of the salt water formation 22 is penetrated by rotary drill bit 16 and drilling is discontinued.

In FIGURE 4, annulus 20 is sealed at the surface with casing head 21, and a bogey run (not shown) is conducted to determine the position of lower level 26 and includes pumping 20 gallons of a sugar-water solution weighted to float on the salt water column and thus create an interface with the salt water column. Pressure is applied to the sugar-water-salt water column to move the column downwardly in the well bore and the stinger is used to simultaneously track the interface. As the column moves downwardly, the salt water is continuously forced into the permeable formation except for the lowermost portion of the salt water column which extends from the lowermost extremity of the well bore upwardly to lower level 26. This lowermost portion is substantially immobile and exerts back pressure at level 26. As a result of this back pressure, the interface will stop moving downwardly at lower level 26 and thus, by noting the depth of the tracking stinger at this point, the position of lower level 26 is known. When other than salt water permeable formations are encountered, it may be necessary to provide salt water to form a column when utilizing this procedure to determine the lower level of the permeable formation.

Pressurized air is introduced at the surface into drill pipe 14 to bring the upper level 30 of water column 28 approximately even with upper level 24 of salt water formation 22. The position of upper level 30 of the water column is located and tracked during this operation with detecting device 32.

In FIGURE 5 the drill pipe and bit are lifted to a position just above the upper level 24 of salt water formation 22; fifty gallons of the composition of the present invention with an electrical conductivity of about 300 ma. at 6 volts and consisting essentially of 20 weight percent of a mixture of 5 percent N,N'-methylenebisacrylamide and 95 percent acrylamide in water; along with 0.3 weight percent of ammonium persulfate, 0.6 weight percent of nitrilotrispropionamide and 1 weight percent calcium chloride is injected down drill pipe 14 at a rate of 2 gallons per minute and positioned in area 36 located above salt water layer 30. Four gallons of secondary buffer, which is an essentially non-conducting solution comprising weak brine with a conductivity of about 120 ma. at 6 volts, and a specific gravity of 1.01 and of a density less than that of the resin-forming composition, is injected down drill pipe 14 and is positioned in area 38 located above resin-containing area 36. Following each of the steps of introducing the resinous material and secondary buffer, it is necessary to lift the drill pipe above the level of the material present in the well bore to insure placement of the incoming material on top of the previously introduced material.

In FIGURE 6 detecting device 32 is lowered into secondary buffer 38', pressurized air (250 p.s.i.) is introduced downwardly in drill pipe 14 and commences to force a displacement of resinous composition 36' thus causing the resinous composition to extend into the formation behind salt water 22 in a manner indicated by 34'. In FIGURE 7, the displacement of resinous material by the air is discontinued when the upper level 40 of the resinous composition 36' is approximately even with the upper level 24 of the salt water-bearing formation 22 as measured by raising and lowering cell 32 through the resin upper buffer interface. The resinous material is maintained in this position by regulating the air pressure at the surface, until it polymerizes and solidifies. To track the secondary buffer, thus the upper level of the resinous material, it may be necessary to lower the drill pipe into the solution of resinous material as illustrated in the drawing. The resinous composition is copolymerized to a semi-solid gel in about 90 minutes although copolymerization time can be controlled by changing the concentration of the catalyst or by adding small amounts of potassium ferricyanide to delay polymerization. The mixture of the resinous ingredients employed in this example are particularly desirable since they will not prepolymerize upon contact with iron, brass or copper. Following the solidification of the resinous composition, air pressure is discontinued, detection device 32 is removed, the drill pipe is raised above the resinous material and air circulation down drill pipe 14 to rotary drill bit as well as drilling are resumed, the solidified resinous composition is drilled-through, and the drilling continues downwardly into the earth's surface as exemplified in FIGURE 9 while removing cuttings from the well bore by air circulation down the drill pipe and up the well annulus.

EXAMPLE III

The following example illustrates a method, using the liquid resin-forming compositions of the present invention for plugging a permeable subterranean well area.

A specific example of our method can be illustrated by references to a field operation which is not to be considered limiting either procedurally or with respect to the composition of the resin-forming material. In this operation the well was a water flood injection well having a 1½" diameter cement tubing and a shot bore hole. Three days were spent cleaning out the well by pumping water in and out of the bore hole using a ½" pipe wash string. An injection profile was obtained by the constant interface method using fresh and salt water and the well was found to be fractured at about 814½' from ground level. The total injection rate of the well was about 1 gallon per minute of fresh water at a well head pressure of 320 p.s.i.g. Five gallons of untriggered resin-forming material, including:

| | Percent |
|---|---|
| Acrylamide | 19 |
| N,N'-methylenebisacrylamide | 1 |
| Calcium chloride | 1 |
| Water | Balance | and with the following properties at about 75° F.:

| | |
|---|---|
| Viscosity | 1.3 centipoises. |
| Specific gravity | 1.12. |
| Electrical conductivity | 300 ma. at 6 volts. | are passed down a ½" tubing which contained a conductivity profiling unit, see application Serial No. 618,583 to Stefan E. Szasz, filed Oct. 25, 1956. The resin-forming material passes by the unit and emerges from the pipe or tubing piece extending from its lower end positioned at the interface between a lower layer of salt water with an electrical conductivity of about 460 ma. at 6 volts and an overlying layer of fresh water with an electrical conductivity of about 100 ma. at 6 volts, which is formed at about 814½' down the well. The resin-forming material is displaced down the ½" tubing at the rate of about 1 gallon per minute and while this is being done fresh water is bled at the well head from the annulus between the ½" tubing and the 1½" cement tubing. After all of the resin-forming material is in the ½" tubing a slug of salt water is added to provide a flush. During the charging of the resin-forming material into the ½" tubing string neither salt nor fresh water is added to the well. After the resin-forming material is placed in the salt-fresh water interface, the lower end of the profiling unit tubing is lowered into the salt water layer; and brine is then pumped down this tubing at the rate of 0.5 gallon per minute while fresh water is charged to the annulus between the ½" tubing and the 1½" cement tubing at the rate of 0.5 gallon per minute. By lowering and raising the profiling unit tubing, while insuring that the bottom end of its lower tubing piece remained in the salt water level, the top of the resin-forming material layer is located at 814' while the bottom is at 815'. This determination is made immediately after the resin-forming material is placed in the interface. This particular resin-forming material is of a specific gravity of about 1.12 and, is, as shown above, of intermediate electrical conductivity so that it could be distinguished from both the salt and fresh water layers by the use of the conductivity profiling instrument. Two minutes after the first check on the resin-forming material only about 0.1' of it could be located by the profiling unit and in less than 1 additional minute the material is completely displaced or moved into the adjacent formation.

Shortly after the untriggered resin-forming material had been displaced into the adjacent formation, 5 additional gallons of this material, an intermediate electrical, conductive mixture (about 300 ma. at 6 volts) and having a specific gravity of about 1.12, is placed in the salt-fresh water interface by the procedure noted above except that the resin-forming material is flushed down the profiling unit tubing by fresh water. This composition, containing 0.1 weight percent nitrilotrispropionamide and 0.2 weight percent ammonium persulfate, has a working time of 20 to 30 minutes, i.e. time during which its viscosity is below about 15 centipoises at ambient temperature, and an initial viscosity of 8.3 centipoises at 70° F. Immediately upon the placing of the resin-forming material in the interface the profiling unit detects it at a position slightly above 814½', the location of the fracture. However, as the permeability of the well at locations other than the fracture was relatively low, the resin-forming material is displaced into the adjacent area through the fraction by continuing the fresh water and brine flows at the rate of 0.5 gallon per minute. A gamma ray source, i.e. cobalt[60] pipe, is lowered to within a distance of 1″ of the material which is subjected to a gamma ray dosage of 1000 Roentgens/hour to effect polymerization of the material in 2 to 3 minutes. Other gamma ray sources such as carbon[14], zinc[65], cesium[134], tantalum[182], and used nuclear reactor fuel elements can also be employed. The polymerization of the resin-forming material polymerizes and results in a substantial plugging of the thief zone. All of the resin-forming material is purged with nitrogen gas prior to its introduction into the well bore through the ½″ tube.

This application is a continuation-in-part of application Serial No. 736,773, filed May 21, 1958.

It is claimed:

1. An electrically conductive aqueous composition consisting essentially of water and a mixture of (a) about 1 to 25 weight percent of a monomeric alkylidene bisacrylamide of the formula

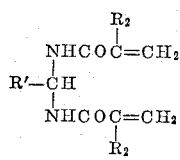

in which

is a hydrocarbon residue of an aldehyde containing from about 1 to 10 carbon atoms and $R_2$ is of the group consisting of hydrogen and methyl and (b) about 75 to 99 weight percent of another ethylenic monomer copolymerizable with (a), said aqueous composition including about 0.5 to 5 weight percent of calcium chloride.

2. The composition of claim 1 wherein the composition is in an aqueous medium and the bisacrylamide is N,N′-methylenebisacrylamide.

3. The composition of claim 2 wherein the ethylenic monomer is acrylamide.

4. The composition of claim 1 wherein the bisacrylamide is N,N′-methylenebisacrylamide and the ethylenic monomer is acrylamide.

5. A method for combatting the obstruction of gas circulation in drilling wells employing gas as the circulation medium, when the obstruction results from the ingress of extraneous materials into the well bore, the steps comprising introducing into the well bore an aqueous resin-forming composition of defined electrical conductivity to enable detection in the well bore consisting essentially of water and a mixture of (a) about 1 to 25 weight percent of a monomeric alkylidene bisacrylamide of the formula

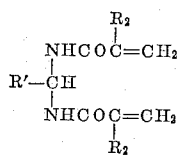

in which

is a hydrocarbon residue of an aldehyde containing from about 1 to 10 carbon atoms and $R_2$ is of the group consisting of hydrogen and methyl and (b) about 75 to 99 weight percent of another ethylenic monomer copolymerizable with (a), said aqueous composition including about 0.5 to 5 weight percent of calcium chloride, tracking the position of the resin-forming material in the well bore with electrical conductivity detection means, applying pressure to the upper level of the resinous composition until said level is at the approximate depth of the top level of the formation of ingress, maintaining the resinous composition in this position until it substantially solidifies, drilling through the solidified resin, and continuing drilling with gas circulation to remove cuttings from the well.

6. A method for selectively decreasing the permeability of a well area, the steps comprising locating adjacent the well bore a permeable area to be plugged which is spaced upwardly from the bottom of the well bore, providing a salt water layer in the lower portion of the well bore to the approximate location of the permeable area, positioning on said salt water layer an aqueous liquid organic resin-forming composition of defined electrical conductivity to enable detection in the well area and consisting essentially of water and a mixture of (a) about 1 to 25 weight percent of a monomeric alkylidene bisacrylamide of the formula

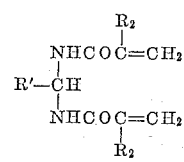

in which

is a hydrocarbon residue of an aldehyde containing from about 1 to 10 carbon atoms and $R_2$ is of the group consisting of hydrogen and methyl and (b) about 75 to 99 weight percent of another ethylenic monomer copolymerizable with (a), said aqueous composition including about 0.5 to 5 weight percent of calcium chloride and having a viscosity of up to about 15 centipoises, determining the position of the resin-forming composition in the well bore with electrical conductivity detection means, moving the resin-forming composition into the adjacent permeable area while its viscosity is up to about 15 centipoises, and allowing the resin-forming material to remain in the adjacent area and set therein to decrease the permeability of the area.

7. A method for decreasing the permeability of a permeable well area in a well, the steps comprising introducing into the well a resin-forming composition of defined electrical conductivity to enable detection in the well bore consisting essentially of an aqueous solution of water and a mixture of (a) about 1 to 25 weight percent of a monomeric alkylidene bisacrylamide of the formula

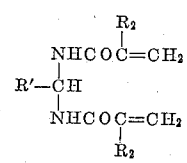

in which

is a hydrocarbon residue of an aldehyde containing from about 1 to 10 carbon atoms and $R_2$ is of the group consisting of hydrogen and methyl and (b) about 75 to 99 weight percent of another ethylenic monomer copolymerizable with (a), said aqueous solution including about 0.5 to 5 weight percent of calcium chloride, tracking the composition with electrical conductivity detection means to locate said composition in said permeable well area, and allowing the resin-forming material to set therein and decrease the permeability of the said well area.

8. An electrically conductive aqueous composition consisting of water and from about 5 percent up to its limit of solubility of a mixture of (a) about 1 to 25 weight percent of a monomeric alkylidene bisacrylamide of the formula

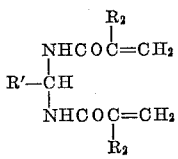

in which

is a hydrocarbon residue of an aldehyde containing from about 1 to 10 carbon atoms and $R_2$ is of the group consisting of hydrogen and methyl and (b) about 75 to 99 weight percent of another ethylenic monomer copolymerizable with (a), said aqueous composition including about 0.8 to 3 weight percent of calcium chloride.

9. The composition of claim 8 wherein the bisacrylamide is N,N'-methylenebisacrylamide and the composition contains from about 5 to 25 percent of the mixture.

10. The composition of claim 9 wherein the ethylenic monomer is acrylamide.

11. A method for decreasing the permeability of a permeable well area in a well, the steps comprising introducing into the well an aqueous resin-forming composition of defined electrical conductivity to enable detection in the well bore consisting essentially of water and a mixture of (a) about 1 to 25 weight percent of a monomeric alkylidene bisacrylamide of the formula

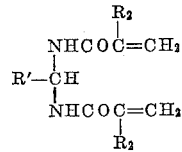

in which

is a hydrocarbon residue of an aldehyde containing from about 1 to 10 carbon atoms and $R_2$ is of the group consisting of hydrogen and methyl and (b) about 75 to 99 weight percent of another ethylenic monomer copolymerizable with (a), said aqueous composition including from about 0.8 to 3 weight percent of calcium chloride, tracking the composition with electrical conductivity detection means to locate said composition in said permeable well area, and allowing the resin-forming material to set therein and decrease the permeability of the said well area.

References Cited in the file of this patent

UNITED STATES PATENTS

| | | |
|---|---|---|
| 2,171,840 | Armentrout | Sept. 5, 1939 |
| 2,708,973 | Twining | May 24, 1955 |
| 2,801,984 | Morgan | Aug. 6, 1957 |
| 2,801,985 | Roth | Aug. 6, 1957 |
| 2,940,729 | Rakowitz | June 14, 1960 |
| 3,011,547 | Holbert | Dec. 5, 1961 |
| 3,044,548 | Perry | July 17, 1962 |
| 3,056,757 | Rakowitz | Oct. 2, 1962 |